United States Patent
Ghaffar et al.

(10) Patent No.: US 7,412,054 B2
(45) Date of Patent: Aug. 12, 2008

(54) MATRIX ENCRYPTION METHOD AND SYSTEM

(75) Inventors: Aamir Ghaffar, Marietta, GA (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 753 days.

(21) Appl. No.: 10/838,712

(22) Filed: May 4, 2004

(65) Prior Publication Data

US 2005/0249349 A1  Nov. 10, 2005

(51) Int. Cl.
    *H04K 1/00*  (2006.01)
(52) U.S. Cl. .................................................. 380/28
(58) Field of Classification Search .................. 380/28
    See application file for complete search history.

(56) References Cited

U.S. PATENT DOCUMENTS

| | | | |
|---|---|---|---|
| 4,322,577 A | 3/1982 | Brändström | |
| 4,520,232 A | 5/1985 | Wilson | |
| 4,972,475 A | 11/1990 | Sant' Anselmo | |
| 5,214,704 A * | 5/1993 | Mittenthal | 380/37 |
| 5,412,729 A | 5/1995 | Liu | |
| 5,537,423 A | 7/1996 | Chen | |
| 5,812,072 A | 9/1998 | Masters | |
| 6,219,421 B1 | 4/2001 | Backal | |
| 6,526,145 B2 | 2/2003 | Marzahn | |
| 2003/0072449 A1 * | 4/2003 | Myszne | 380/265 |

FOREIGN PATENT DOCUMENTS

| | | |
|---|---|---|
| EP | 0 632 598 A1 | 9/1996 |
| JP | 9200541 | 7/1997 |
| JP | 2001013870 A | 1/2001 |

OTHER PUBLICATIONS

Applied Cryptography, Second Edition, Bruce Schneier, John Wiley & Sons, 1996, ISBN 0-471-11709-9 , pp. 10-11☐☐.*
Ritter, T. 1990. Substitution Cipher with Pseudo-Random Shuffling: The Dynamic Substitution Combiner. Cryptologia. 14(4): 289-303.*
IBM Technical Disclosure Bulletin, 12x12-Bit Signed Multiplier, vol. 28, No. 5, Oct. 1985; and.
IBM Technical Disclosure Bulletin, "Integrated Hadamard Image Scanner", vol.18, No. 7, Dec. 1975.

* cited by examiner

*Primary Examiner*—Kristine Kincaid
*Assistant Examiner*—James Turchen
(74) *Attorney, Agent, or Firm*—Scully, Scott, Murphy & Presser, P.C.; John R. Pivnichny

(57) ABSTRACT

Disclosed are an encryption method and system. The method comprises the steps of providing a message to be encrypted, said message having a string of characters; and providing a matrix having characters in a last row and numbers in all other rows. A string of numbers is formed from said string of characters by selecting the number in the next to last row in said matrix in the column corresponding to a character of said string of characters. The remaining numbers in said column are shifted down one row, and the selected number is placed in a queue. The method comprises the further steps of continuing until upon depletion of numbers from a column, shifting columns in said matrix, refilling the empty column with numbers from said queue, and shifting each row in said matrix.

12 Claims, 3 Drawing Sheets

FIG. 2

| 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | 77 | 78 |
|----|----|----|----|----|----|----|----|----|----|----|----|----|----|----|----|----|----|----|----|----|----|----|----|----|----|
| 31 | 32 | 33 | 34 | 35 | 36 | 37 | 38 | 39 | 40 | 41 | 42 | 43 | 44 | 45 | 46 | 47 | 48 | 49 | 50 | 51 | 52 | 30 | 29 | 28 | 27 |
| 1  | 2  | 3  | 4  | 5  | 6  | 7  | 8  | 9  | 0  | 11 | 12 | 13 | 14 | 15 | 16 | 17 | 18 | 19 | 20 | 21 | 22 | 23 | 24 | 25 | 26 |
| A  | B  | C  | D  | E  | F  | G  | H  | I  | J  | K  | L  | M  | N  | O  | P  | Q  | R  | S  | T  | U  | V  | W  | X  | Y  | Z  |

|    | 54 | 55 | 56 | 57 | 58 | 59 | 60 | 61 | 62 | 63 | 64 |    | 66 | 67 | 68 | 69 | 70 | 71 |    | 73 | 74 | 75 | 76 | 77 | 78 |
|----|----|----|----|----|----|----|----|----|----|----|----|----|----|----|----|----|----|----|----|----|----|----|----|----|----|
| 53 | 32 | 33 | 34 | 35 | 36 | 37 | 38 | 39 | 40 | 41 | 42 | 65 | 44 | 45 | 46 | 47 | 48 | 49 |    | 51 | 52 | 30 | 29 | 28 | 27 |
| 31 | 2  | 3  | 4  | 5  | 6  | 7  | 8  | 9  | 0  | 11 | 12 | 43 | 14 | 15 | 16 | 17 | 18 | 19 | 72 | 21 | 22 | 23 | 24 | 25 | 26 |
| A  | B  | C  | D  | E  | F  | G  | H  | I  | J  | K  | L  | M  | N  | O  | P  | Q  | R  | S  | T  | U  | V  | W  | X  | Y  | Z  |

TEMPORARY QUEUE 32

| 13 | 1 | 20 | 50 | | | | | | | | | | | | | | | | | | | | | | |
|----|---|----|----|--|--|--|--|--|--|--|--|--|--|--|--|--|--|--|--|--|--|--|--|--|--|

FIG. 5

| 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | 77 | 78 |
|----|----|----|----|----|----|----|----|----|----|----|----|----|----|----|----|----|----|----|----|----|----|----|----|----|----|
| 31 | 32 | 33 | 34 | 35 | 36 | 37 | 38 | 39 | 40 | 41 | 42 | 43 | 44 | 45 | 46 | 47 | 48 | 49 | 50 | 51 | 52 | 30 | 29 | 28 | 27 |
| 1  | 2  | 3  | 4  | 5  | 6  | 7  | 8  | 9  | 0  | 11 | 12 | 13 | 14 | 15 | 16 | 17 | 18 | 19 | 20 | 21 | 22 | 23 | 24 | 25 | 26 |
| A  | B  | C  | D  | E  | F  | G  | H  | I  | J  | K  | L  | M  | N  | O  | P  | Q  | R  | S  | T  | U  | V  | W  | X  | Y  | Z  |

TEMPORARY QUEUE 32

| 13 | 1 | 20 | 50 | 3 | 37 | 72 | | | | | | | | | | | | | | | | | | | |
|----|---|----|----|----|----|----|--|--|--|--|--|--|--|--|--|--|--|--|--|--|--|--|--|--|--|

|    | 54 |    | 56 | 57 | 58 | 59 | 60 | 61 | 62 | 63 | 64 |    | 66 | 67 | 68 | 69 | 70 | 71 |    | 73 | 74 | 75 | 76 | 77 | 78 |
|----|----|----|----|----|----|----|----|----|----|----|----|----|----|----|----|----|----|----|----|----|----|----|----|----|----|
|    | 32 | 55 | 34 | 35 | 36 | 37 | 38 | 39 | 40 | 41 | 42 | 65 | 44 | 45 | 46 | 47 | 48 | 49 |    | 51 | 52 | 30 | 29 | 28 | 27 |
| 53 | 2  | 33 | 4  | 5  | 6  | 7  | 8  | 9  | 0  | 11 | 12 | 43 | 14 | 15 | 16 | 17 | 18 | 19 |    | 21 | 22 | 23 | 24 | 25 | 26 |
| A  | B  | C  | D  | E  | F  | G  | H  | I  | J  | K  | L  | M  | N  | O  | P  | Q  | R  | S  | T  | U  | V  | W  | X  | Y  | Z  |

| 54 |    |    | 56 | 57 | 58 | 59 | 60 | 61 | 62 | 63 | 64 |    | 66 | 67 | 68 | 69 | 70 | 71 | 73 | 74 | 75 | 76 | 77 | 78 |    |
|----|----|----|----|----|----|----|----|----|----|----|----|----|----|----|----|----|----|----|----|----|----|----|----|----|----|
| 32 |    | 55 | 34 | 35 | 36 | 37 | 38 | 39 | 40 | 41 | 42 | 65 | 44 | 45 | 46 | 47 | 48 | 49 | 51 | 52 | 30 | 29 | 28 | 27 |    |
| 2  |    | 33 | 4  | 5  | 6  | 7  | 8  | 9  | 0  | 11 | 12 | 43 | 14 | 15 | 16 | 17 | 18 | 19 | 21 | 22 | 23 | 24 | 25 | 26 | 53 |
| A  | B  | C  | D  | E  | F  | G  | H  | I  | J  | K  | L  | M  | N  | O  | P  | Q  | R  | S  | T  | U  | V  | W  | X  | Y  | Z  |

| 54 | 20 |    | 56 | 57 | 58 | 59 | 60 | 61 | 62 | 63 | 64 |    | 66 | 67 | 68 | 69 | 70 | 71 | 73 | 74 | 75 | 76 | 77 | 78 |    | — 30a |
| 32 | 1  | 55 | 34 | 35 | 36 | 37 | 38 | 39 | 40 | 41 | 42 | 65 | 44 | 45 | 46 | 47 | 48 | 49 | 51 | 52 | 30 | 29 | 28 | 27 |    | — 30b |
| 2  | 13 | 33 | 4  | 5  | 6  | 7  | 8  | 9  | 0  | 11 | 12 | 43 | 14 | 15 | 16 | 17 | 18 | 19 | 21 | 22 | 23 | 24 | 25 | 26 | 53 | — 30c |
| A  | B  | C  | D  | E  | F  | G  | H  | I  | J  | K  | L  | M  | N  | O  | P  | Q  | R  | S  | T  | U  | V  | W  | X  | Y  | Z  |       |

FIG. 10

TEMPORARY QUEUE 32

| 3 | 31 | 72 | | | | | | | | | | | | | | | | | | | | | | | |
|---|----|----|--|--|--|--|--|--|--|--|--|--|--|--|--|--|--|--|--|--|--|--|--|--|--|

MATRIX ENCRYPTION METHOD AND SYSTEM

BACKGROUND OF THE INVENTION

1. Field of the Invention

This invention generally relates to data security, and more specifically, the invention relates to methods and systems for encrypting data.

2. Background Art

Many different types of data security measures are known. Presently, most widespread data security measures are based on public-key encryption, in which a first, publicly available key is used to encrypt data, and a second, secret or private key is used to decrypt the data.

Public key cryptography suffers from various disadvantages. For example, administration is typically required to ensure that public keys are assigned to each user. A person's public key must be listed in a directory and must be found in the directory prior to encrypting a message. The computational burden of public-key cryptography is significant both in generating random prime numbers for use as keys and in the encryption and decryption processing itself. Furthermore, despite the computational complexity, public key encryption using medium size keys has been shown to be insecure given the tremendous network computing resources that may be brought to bear on breaking the encryption.

Another cryptography approach that can be used is symmetric-key cryptography, which requires the use of the identical key to decrypt a data file as was used to encrypt the file. The key, thus, needs to be communicated in secret between users. The necessary. secret communication can be cumbersome and difficult. Moreover, the required secrecy is not always maintained.

SUMMARY OF THE INVENTION

An object of this invention is to provide a very secure, yet simple and fast, encoding and decoding procedure.

Another object of the present invention is to provide a matrix based encoding procedure that encodes and decodes large amounts of data very securely and at high speeds.

A further object of the invention is to provide a multiple key, matrix based encoding procedure that is simple to use but also is very fast and effective.

These and other objectives are attained with an encryption method and system. The method comprises the steps of providing a message to be encrypted, said message having a string of characters; and providing a starting matrix having distinct characters in a last row and distinct numbers in all other rows. A string of numbers is formed from said string of characters by selecting the number in the next to last row in said matrix in the column corresponding to a character of said string of characters. The remaining numbers in said column are shifted down one row, and the selected number is placed in a queue. The method comprises the further steps of continuing until upon depletion of numbers from a column, performing a circular shift right of all columns in said matrix by a specified amount, refilling the empty column by popping numbers from said queue, and performing a circular shift right of each row in said matrix by an amount related to the last number popped. The invention can be embodied in a program storage device readable by machine, tangibly embodying a program of instructions executable by the machine to perform method steps for encrypting a message.

The preferred embodiment of the invention, described in detail below, uses a three key system to decipher and encrypt messages. The first key is the starting matrix itself, the second key is the column shift algorithm, and the third key is the row shift algorithm. This is not a public-private key association, like ASA encoding. Instead, the encoding of this invention is based on matrix transforms.

An important advantage of the present invention is the security of three keys and the speed of encoding off the matrix transforms. Once the key is sent, streamed data can be continuously processed using this invention. Also, since the matrix transforms are, preferably, simple, real time encryption can be very fast.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 2 is an example of a matrix that may be used in the present invention.

FIG. 3 shows the matrix of FIG. 2 after a group of values have been removed from the matrix.

FIG. 4 illustrates a temporary queue used to store values removed from the matrix.

FIG. 5 also shows the encoding matrix of FIG. 1.

FIG. 6 depicts a temporary queue used to store values removed from the encoding matrix of FIG. 6.

FIG. 7 shows the matrix of FIG. 5 after a group of values have been removed.

FIG. 8 illustrates the matrix of FIG. 7 after a column shift has been performed.

FIG. 9 shows the matrix of FIG. 8 after the empty column has been refilled.

FIG. 10 shows the temporary queue after numbers have been removed to refill the empty matrix column.

DETAILED DESCRIPTION OF THE PREFERRED EMBODIMENTS

Figure 1:
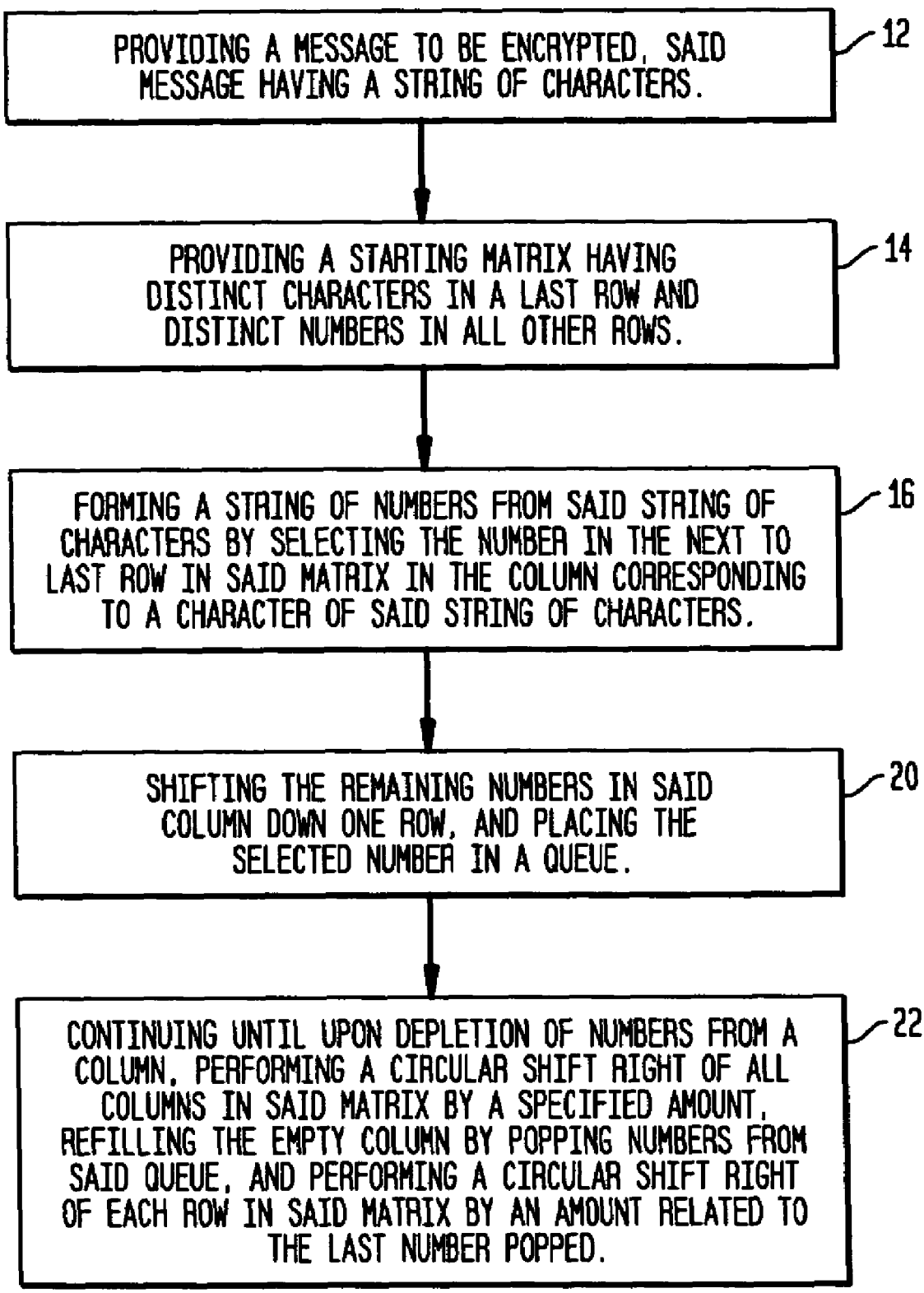
FIG. 1 is a flow chart showing a preferred procedure for implementing this invention.

The present invention, generally, provides an encryption method and system. With reference to FIG. 1, in the method, at step 12, a message to be encrypted is provided, said message having a string of characters; and, at step 14, a starting matrix is provided having distinct characters in a last row and distinct numbers in all other rows. At step 16, a string of numbers is formed from said string of characters by selecting the number in the next to last row in said matrix in the column corresponding to a character of said string of characters. At step 20, the remaining numbers in said column are shifted down one row, and the selected number is placed in a queue.

The method comprises the further step 22 of continuing until upon depletion of numbers from a column, performing a circular shift right of all columns in said matrix by a specified amount, refilling the empty column by popping numbers from said queue, and performing a circular shift right of each row in said matrix by an amount related to the last number popped.

The preferred embodiment of the invention, described in detail below, uses a three key system to decipher and encrypt messages. The first key is the starting matrix itself, the second key is the column shift algorithm, and the third key is the row shift algorithm. This is not a public-private key association, like ASA encoding. Instead, the encoding of this invention is based on matrix transforms.

Key 1: The Starting Matrix

FIG. 2 is an example of a matrix 30 having three rows of encryption numbers. The bottom, fourth row of the matrix shows the relationship between the matrix and a correspond value.

In the preferred encryption process of this invention, as letters within the matrix are used, the numbers associated with those letters are removed from each corresponding value queue in the matrix until the queue is empty.

For example, with the encoding matrix of FIG. 2, MATT is encoded as follows: 13 1 20 50. After this encoding, the matrix contains the values as shown in FIG. 3.

Also, as numbers are removed from the matrix 30, those numbers are stored in a temporary queue. FIG. 4 shows a temporary queue 32 for storing the values 13 1 20 50, which were taken from the matrix 30 of FIG. 2 to encode MATT.

The temporary queue can have any suitable size. The worst case scenario of queue size would be ((the number of rows in the matrix−1)*(number of values in each row))+1. Using this method, all ascii characters can be encoded.

The importance in decoding relies on the initial matrix values. A message cannot be decoded without that initial matrix.

As the values associated with a particular letter are depleted from the matrix, numbers from the temporary queue 32 are taken, or "popped," to refill the matrix. FIGS. 5, 6 and 7 illustrate an example of this.

In this example, the term "MATTCAT" is encoded as follows: 13 1 20 50 3 31 and 72. These values are stored in the temporary queue 32 of FIG. 6. As shown in FIG. 7, in this example, the values for T are depleted from the matrix 30

Key 2: A Column Shift

Replacement values for T can be taken from the temporary queue 32 of FIG. 6. Preferably, though, before these values are put back into the matrix, a column shift right is performed—that is, the columns of the matrix are shifted.

Any suitable procedure may be used to determine the amount of the shift. For instance, the following equation may be used to determine the shift:

Ceil (Sin(last value placed into the temporary queue)
*10)

Shift value=floor (Sin(72)*10)=9

Starting with the empty column of matrix 30, a circular shift to the right is performed on the columns of the matrix of FIG. 7, yielding the matrix of FIG. 8.

The empty column of the matrix of FIG. 8 is now refilled. Preferably, this is done by taking values off the front of the temporary queue 32 and refilling the empty column, producing the matrix of FIG. 9.

Key 3: A Row Shift

Next, preferably, the rows of the matrix 30 are individually shifted. Any suitable procedure may be used to do this. Any shifting equation is acceptable as long as it is an integer shift. For example, an equation used to determine the row shifts may be based on the last number taken from the temporary queue. As a more specific example, row 30$a$ may be shifted 13 places to the right, row 30$b$ may be shifted one place to the right, and row 30$c$ may be shifted 20 places to the right.

The preferred embodiment of this invention, as described above, provides a number of important advantages. For instance, one important advantage of the present invention is the security of three keys and the speed of encoding off the matrix transforms. Once the key is sent, streamed data can be continuously processed using this invention. Also, since the matrix transforms are preferably simple, real time encryption can be very fast.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. An encryption method, comprising the steps of:
   providing a message to be encrypted, said message having a string of characters;
   providing a starting matrix having (i) a multitude of columns and a multitude of rows, said multitude of rows including a last row and a next to the last row, and (ii) distinct characters in all of the columns in the last row and distinct numbers in all of the columns in all of the other rows, and wherein each of the characters in said string corresponds to one of the columns of the matrix;
   forming a string of numbers from said string of characters by, for each of said string of characters, selecting the number in the next to last row in said matrix in the column corresponding to said each of said string of characters, removing the selected number from the matrix, placing the selected number in a queue, and when said corresponding column has any remaining numbers, shifting all of said remaining numbers in said corresponding column down by one row; and
   continuing until one of the columns becomes depleted of numbers; and when said one column becomes depleted of numbers performing a circular shift right of all columns in said matrix by a specified amount to refill said depleted column with numbers, and thereby forming new number vacancies in other columns, refilling said new vacancies with numbers taken from said queue, and performing a circular shift right of each row, except said last row, in said matrix.

2. A method according to claim 1, wherein the refilling step includes the step of taking numbers from said queue in a specified order to refill the empty column.

3. A method according to claim 1, wherein the refilling step includes the step of taking numbers from the queue, in the order in which said numbers were placed in the queue, to refill the empty column.

4. A method according to claim 1, wherein the step of performing a circular shift right of columns in the matrix includes the step of shifting the columns an amount determined by using a given equation.

5. A method according to claim 1, wherein the step of performing a shift right of the columns is done prior to the refilling step.

6. A method according to claim 1, wherein the step of performing a shift right of each row is done after the refilling step, and the amount of the right shift of each row is based on a last number taken from said queue.

7. A program storage device readable by machine, tangibly embodying a program of instructions executable by the machine to perform method steps for encrypting a message, said method steps comprising:
   providing a message to be encrypted, said message having a string of characters;
   providing a starting matrix having (i) a multitude of columns and a multitude of rows, said multitude of rows including a last row and a next to the last row, and (ii)

distinct characters in all of the columns in the last row and distinct numbers in all of the columns in all of the other rows;

forming a string of numbers from said string of characters by, for each of said string of characters, selecting the number in the next to last row in said matrix in the column corresponding to said each of said string of characters, removing the selected number from the matrix, placing the selected number in a queue, and when said corresponding column has any remaining numbers, shifting all of said remaining numbers in said corresponding column down by one row; and continuing until one of the columns becomes depleted of numbers; and when said one column becomes depleted of numbers, performing a circular shift right of all columns in said matrix by a specified amount to refill said depleted column with numbers, and thereby forming new number vacancies in other columns, refilling said new vacancies with numbers taken from said queue, and performing a circular shift right of each row, except said last row, in said matrix.

8. A program storage device according to claim 7, wherein the refilling step includes the step of taking numbers from said queue in a specified order to refill the empty column.

9. A program storage device according to claim 7, wherein the refilling step includes the step of taking numbers from the queue, in the order in which said numbers were placed in the queue, to refill the empty column.

10. A program storage device according to claim 7, wherein the step of performing a circular shift right of columns in the matrix includes the step of shifting the columns an amount determined by using a given equation.

11. A program storage device according to claim 7, wherein the step of performing a shift right of the columns is done prior to the refilling step.

12. A program storage device according to claim 7, wherein the step of performing a shift right of each row is done after the refilling step, and the amount of the right shift of each row is based on a last number taken from said queue.

* * * * *